United States Patent [19]

Bonner et al.

[11] 4,314,285
[45] * Feb. 2, 1982

[54] EDITING SYSTEM FOR VIDEO APPARATUS

[76] Inventors: Edgar L. Bonner, 325 E. Main Ave., Taylorsville, N.C. 28681; Nelson A. Faerber, 900 Sixth Ave. South, Naples on the Gulf, Fla. 33940

[ * ] Notice: The portion of the term of this patent subsequent to Mar. 31, 1998, has been disclaimed.

[21] Appl. No.: 38,161

[22] Filed: May 11, 1979

[51] Int. Cl.³ .......................... H04N 5/48; H04N 5/76
[52] U.S. Cl. ...................................... 360/33; 358/127; 358/165; 358/188
[58] Field of Search ................... 360/33, 14; 358/127, 358/10, 139, 160, 165, 185, 188

[56] References Cited

U.S. PATENT DOCUMENTS

| | | | |
|---|---|---|---|
| 3,330,907 | 7/1967 | Avimura et al. | 358/139 |
| 3,378,775 | 4/1968 | Joseph | 358/188 |
| 3,424,865 | 1/1969 | Marchand | 358/165 |
| 3,493,676 | 2/1970 | Guerin | 360/33 |
| 3,520,992 | 7/1970 | Iwai et al. | 360/33 |
| 3,919,479 | 11/1975 | Moon et al. | 179/1 SB |
| 4,000,517 | 12/1976 | Brickard, Jr. | 179/100.1 VC |
| 4,047,226 | 9/1977 | Hedges | 358/165 |

OTHER PUBLICATIONS

Electronics Helps Advertisers Keep Track of TV Ads, 5/71, Electronics Design 11, 5/27/71, pp. 26–27.

*Primary Examiner*—Raymond F. Cardillo, Jr.
*Attorney, Agent, or Firm*—Blair, Brown & Kreten

[57] ABSTRACT

An advertising editing system for a video apparatus including a relay for controlling the operation of the video apparatus and a detector for sampling the voltage of the video signal and a comparator for comparing the sampled voltage amplitude with a reference voltage to provide an output voltage signal upon absence of picture information in the video signal for a period of time corresponding to at least one frame to activate the relay and condition the video apparatus during the period of the commercial message.

10 Claims, 3 Drawing Figures

EDITING SYSTEM FOR VIDEO APPARATUS

BACKGROUND OF THE INVENTION

A television set has become today a basic ingredient in everyday living and it is rare to find a home today which does not have at least one television set. With this wide audience available to television network companies and the attendant advertising revenue source, the use of commercial messages during the broadcasting of program material is increasing with greater and greater frequency so that a substantial portion of the entertainment program material is being preempted by commercial messages for advertising purposes. While the interruption of such program material for commercial material messages has always been somewhat disturbing to the viewing audience, the increase in preemption of time of the program material for advertising is beginning to bring about a strong adverse reaction by the viewing audience and a disillusionment or dissatisfaction with television in general. Very little has been done in the past to eliminate the disturbing aspects of commercial messages in television broadcasting since, to the broadcasting network, such a reduction in commercial message would be accompanied by a loss of advertising revenue. On the other hand, the television viewer with a typical lack of skill in electronic matters can do very little to ameliorate the distasteful aspects of television advertising broadcasting. One such effort in the past, which has met with very little success, has been to use the increased sound volume accompanying a commercial message to trigger a suitable device for shutting off the set or for eliminating the sound. The only recourse left for the typical television viewer is simply to cut off the set or turn down the audio in the set manually or by some type of remote control, such an approach being highly inconvenient and seldom practiced.

Another type of video apparatus found widely in use today is a video tape or cassette recorder (VCR) by means of which television programs may be taped and stored for future use is becoming increasingly more widespread. VCR's are generally provided with a video output jack which permit the monitoring of the video signal which is being recorded or played from the tape. In addition, such VCR's are generally provided with a pause control button by means of which the VCR may be stopped selectively in the event an interruption in the program material being recorded is desired. In addition, such VCR's are generally provided with a terminal for receiving a jack connected to a remote control device which permit the operator of the VCR to interrupt the operation of the VCR when recording or taping of parts of the televised material is not desired. As is well known, the recording of advertising or commercial messages on a VCR tape is highly undesirable since it is only the picture information which the user wishes to be taped. The common practice is for the operator of the VCR to control the pause control on the VCR and when a commercial message appears on the television screen, the VCR is deactivated for the period of the commercial message following which the taping of the picture information is resumed. This is at best a very time consuming and awkward procedure and, of course, requires the presence of an individual during such recording or taping thereby losing the advantage of the automatic operation of the VCR unless the user is willing to accept the recorded program with commercial messages.

OBJECTS AND SUMMARY OF THE INVENTION

Accordingly, a primary object of this invention is to provide a new and novel device for automatically controlling the audio output of a television set during the broadcasting of commercial messages on the set.

Another object of this invention is to provide a new and novel automatic television editing system which responds immediately to the absense of picture information in the video signal for at least one frame, a prelude to the presentation of a commercial message on the set either to disconnect or to diminish the audio output of the set during the commercial message.

A further object of this invention is to provide a new and novel television editing system which may be easily attached to any commercially available television set for diminishing or discontinuing the audio output of the set upon the absence of picture information for at least one frame, a prelude to commercial messages, which is simple and inexpensive in construction and which utilizes a minimum of readily available commercial parts to instantaneously and without fail respond to the beginning of one or more commercial messages to remove the audio output from the set.

Still a further object of this invention is to provide a new and novel television editing system in which the video signal in the set is utilized to interrupt the audio output from the set during a commercial message and which may be applied easily to both color and black and white television sets.

A further object of this invention is to provide a new and novel editing system for a video apparatus such as a video cassette recorder (VCR) which permits the taping of program information automatically without commercial material.

Still another object of this invention is to provide a new and novel editing system for a video cassette recorder which permits the utilization of a commercially available VCR without modification to record only picture information automatically and which utilizes the pause control to interrupt the recording operation, upon the absence of picture information in video signal for at least one frame, during the entire period of commercial messages included with television program material.

The objects of the present invention and other related objects are accomplished by providing relay means for controlling the operation of the video apparatus such as a television set, VCR or the like which includes relay means for controlling the operation of the video apparatus and means for detecting the voltage level of the video signal in the video apparatus. Means are provided for connecting the detecting means to a source of the video signal in the video apparatus to output a voltage signal representing the peak voltage amplitude of the video signal which voltage signal is compared in a comparator connected to an associated source of electric power with a reference voltage to provide an output voltage signal when the voltage level in the video signal is diminished due to absence of picture information in the video signal for at least one frame. Voltage responsive means are connected to the comparator for responding to the output voltage signal from the comparator to activate the relay means for controlling the operation of the video apparatus such as actuating the pause control in the VCR or diminishing the audio output from a television set with which the editing system of the invention is associated.

The objects stated above and other related objects and advantages of the invention will become apparent from the following description taken in connection with the accompanying drawings, in which:

DESCRIPTION OF THE PREFERRED EMBODIMENT

Figure 1:
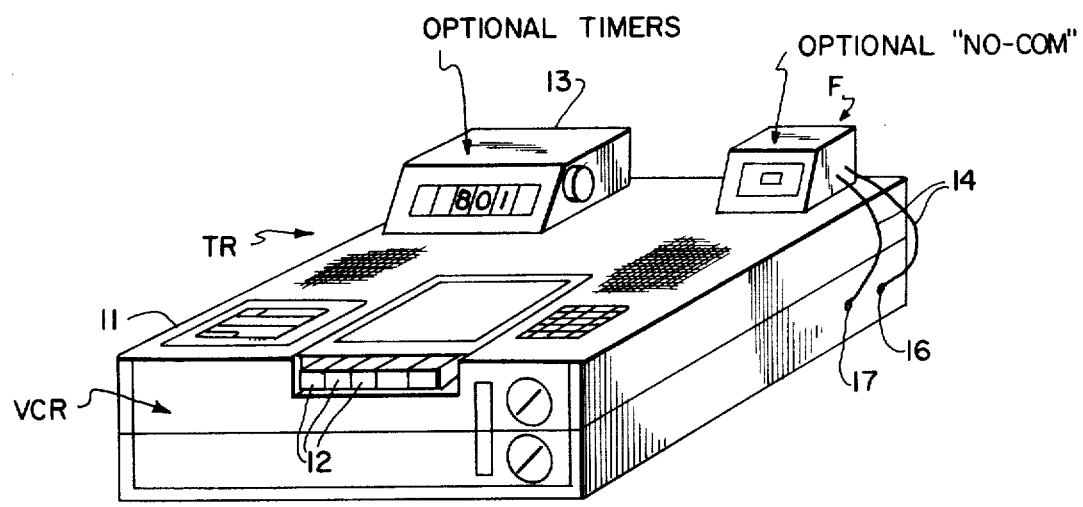
FIG. 1 is a perspective view of a video cassette recorder together with the advertising editing system of the invention.

There is shown in FIG. 1 a typical commercially available video cassette recorder (VCR) which is designated generally TR and which is used to tape television program material. The VCR TR includes a housing 11 provided with a plurality of control buttons 12 one of which is "pause control" by means of which the operation of the VCR may be interrupted to discontinue the taping of the television program material. The VCR TR may also include optionally a timer 13 and as shown in FIG. 1, the editing system of the invention designated generally by the letter F is shown positioned in a suitable location on the VCR housing 11. In order to control the operation of the VCR TR with the advertising editing system of the invention, a plurality of conductors 14 are connected to the advertising editing system F and are provided with a suitable jack at their opposite ends which are adapted to be inserted within apertures 16, 17 in the housing 11. Aperture 16 is identified in the VCR TR by the designation "Video Out" and provides for connection of the VCR TR to a television set for replaying the taped television program information. Aperture 17 is identified as the "pause" terminal and is utilized to actuate the "pause control" portion of the VCR TR.

Figure 2:
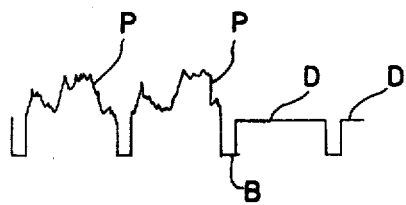
FIG. 2 is a diagram of a conventional video signal from a television set showing both the picture information and the interruptions due to commercial messages.

Referring now to FIG. 2, there is shown a typical video signal including picture information designated by the letter P. As is well known, just prior to the beginning of a commercial message, the video signal picture information P is interrupted for a brief moment, for example starting at a point in time indicated by a blanking pulse B, during which period of time the video goes dark as indicated at D for at least one frame; that is, the picture information no longer appears. This period of time during which the picture information P goes dark as a prelude to a commercial is about 0.3 seconds or somewhat greater in many television broadcasts and it is this interruption in the video picture information P which is utilized in the operation of the editing system of the invention as is to be explained hereinafter. It has been found that nearly every commercial message in television broadcasting is preceded by this brief period when the video picture information goes dark. The video signal shown in FIG. 2 is typical of a video signal output from the VCR video output jack. The presence of picture information P is indicated by an increase in the peak positive amplitude of the video signal as shown in FIG. 2. It should be understood that video signal utilized in the system of the invention is that video signal produced by the VCR during the recording operation.

Figure 3:
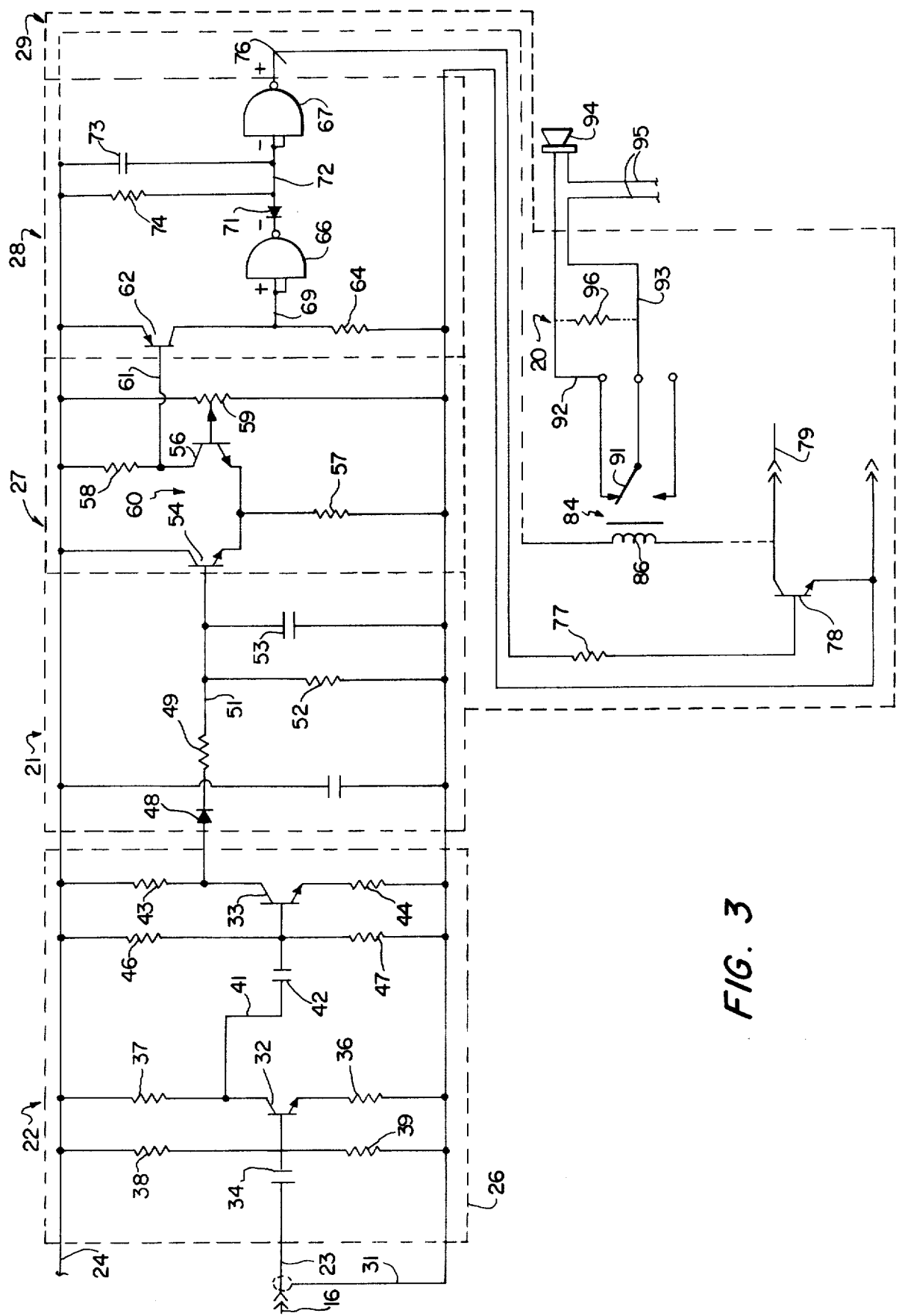
FIG. 3 is a schematic wiring diagram of the circuit incorporated in the editing system of the invention.

Referring now to FIG. 3, there is shown a circuit utilizing the advertising editing system of the invention which is arranged to be connected to the source of a video signal such as the VCR video output terminal 16 or to appropriate terminals in a television set at which the video signal appears. In the illustrated embodiment of FIG. 3, the circuit is to be described in connection with the sampling of the video output on terminal 16 of the VCR TR.

The circuit of FIG. 3 includes means for detecting and sampling the video signal from the VCR TR which is designated generally by the numeral 21 and enclosed in broken lines as shown and which is preferably connected to a video amplifier section designated generally by the numeral 22. The video amplifier section 22, as shown enclosed in broken lines in FIG. 3, has an input arranged to be connected to the VCR video output terminal 16 with the use of a jack or the like connected to a conductor 23. The circuit of FIG. 3 is arranged to be connected to an associated source DC power which includes a positive power supply conductor 24 and ground 26.

The detecting means 21 is arranged to be connected to comparator means designated generally by the numeral 27 for comparing the output of the detecting means 21 representing the peak positive signal of video picture information with a reference voltage. When the video picture information is interrupted by commercial message so that the video signal representing the picture information disappears, the comparator means 27 outputs a voltage signal which is fed to voltage responsive means designated generally by the reference numeral 28 to actuate relay means designated generally by the numeral 29 for actuating the pause control of the VCR or to discontinue or diminish the audio input of a television set.

In the video amplifier section 22 of the circuit of FIG. 3, which, as discussed above, is preferably included in the circuit, the input conductor 23 is of the shielded type with the shielding connected to the ground by conductor 31. The video amplifier section 22 includes transistors 32, 33 forming video amplifier stages which amplify the video signal. The video amplifier section 22 is coupled to the video signal input by capacitor 34 and isolates the video signal input from the detecting means 21. Conductor 23 is connected to the base of transistor 32, the emitter and collector of which are connected through resistors 36, 37 to ground and the power conductor 24 respectively. The base of transistor 32 is also connected to the power conductor 24 and ground 26 by resistors 38, 39 respectively.

The collector of transistor 32 is connected by conductor 41 through a capacitor 42 to the base of transistor 33, the collector and emitter of which are connected through resistors 43, 44 to the power conductor 24 and ground 26 respectively. Also, the base of transistor 33 is connected through resistors 46, 47 to the power conductor 24 and ground 26 respectively.

The collector of transistor 33 is connected to the anode of a diode 48 which diode 48 samples the peak positive signal of the video picture information and the signal from the diode is fed from the diode cathode through resistor 49 to a RC filter comprising resistors 49, 52 and capacitor 53 connected between conductor 51 and ground. The signal, after being filtered by the RC filter comprising resistors 49, 52 and capacitor 53 is applied to the base of a transistor 54 which in conjunction with transistor 56 form a comparator in the comparing means 27, the emitters of the transistors 54, 56 being connected through resistor 57 to ground.

The collector of transistor 54 is connected to the power conductor 24 and the collector of transistor 56 is connected through resistor 58 to the power conductor 24. The base of transistor 56 is connected to the movable contact of a potentiometer 59 connected between the power conductor 24 and ground 26, and the collector of transistor 56 is also connected by conductor 61 to the base of a transistor 62. Transistors 54, 56 form a voltage comparator 60 which drives transistor 62 and when the video picture information disappears from the video signal during the interval, that is for at least one frame, between the program material and the commercial message or advertising, the voltage level across capacitor 53 decreases.

When the voltage on capacitor 53 decreases below the reference level set at the base of transistor 56 by the potentiometer 59, transistor 56 conducts and drives transistors 62 into conduction. The transistor 62 therefore forms part of the voltage responsive means 28 and has its emitter connected to the power supply conductor 24 and its collector connected through resistor 64 to ground 26. The voltage responsive means 28 includes a pair of control gates 66, 67 preferably Schmitt trigger gates. When transistor 62 is driven into conduction by transistor 56, the output of transistor 62 on conductor 69 drives the input of gate 66 positive. When the positive input signal on conductor 69 exceeds the threshold level of gate 66, the output of gate 66 is driven negative. Therefore, the reduction in the voltage level on filter capacitor 53 below the level at the base of transistor 56, the output of gate 66 is driven negative.

The output of gate 66 is connected to the cathode of a diode 71, the anode of which is connected by conductor 72 to the input of the second control gate 67. When the output of gate 66 is driven negative, diode 71 conducts to ground and charges a timing capacitor 73 connected between the power supply conductor 24 and conductor 72. Also connected between conductor 72 and the power supply conductor 24 is a resistor 74. When capacitor 73 is charged, the input on conductor 72 to gate 67 is negative and the output of gate 67 is driven positive to provide a positive voltage signal on conductor 76 connected through resistor 77 to the base of a control transistor 78 in the relay means 29. Transistor 78 is connected through its collector to the pause control on the VCR TR as represented by the terminal 17 in FIG. 1 and by conductor 79, the connection to the pause control also includes a ground connection connected to the circuit ground 26 and to the emitter of transistor 78.

When the output of control gate 67 is positive, transistor 78 provides power to the pause control of the VCR TR which will stop the tape and the recording process as long as transistor 78 is conducting.

Transistor 78 will continue to conduct as long as the input to gate 67 is below the threshold level and the time during which the input of gate 67 is below the threshold level is determined by the discharge of capacitor 73 through resistor 74. Preferably, this period of time is set to be about 35 to 40 seconds. Capacitor 73 is reset to the negative level if during that time period, the detecting means 21 indicates another interruption of the picture information in the video signal by a commercial message. It should be noted that this may also occur between commercial messages. After the lapse of the time period, the circuit of FIG. 3 releases the pause control or the audio control on a television set after the period of 35 to 40 seconds if no interruptions in the picture information of the video signal is detected by the detecting means 21.

If it is desired to use the system of the invention to control the audio output of a television set, a relay 84 may be provided. Relay 84 includes a double pole, single throw switch 91 which in the deenergized condition of the coil 86 moves into the solid line position of FIG. 3 to complete a circuit through conductors 92 and 93 to the audio output speaker 94 of the television set S connected in the well known manner by conductors 95 to the internal audio amplifier. When transistor 83 conducts, relay coil 86 is energized and the switch 91 moves from the solid line to the dotted line position disconnecting the speaker 94 and eliminating the audio from the television set. If a diminished sound level is desired, a resistor 96 is connected across conductors 92, 93, so that when the relay 84 is actuated the audio from speaker 94 is diminished rather than discontinued.

Having thus described the preferred embodiment of the invention it should be understood that numerous structural modifications and adaptations may be resorted to without departing from the spirit of the invention.

What is claimed is:

1. An editing system for video apparatus comprising, in combination, switching means for controlling the operation of said video apparatus, means for detecting the voltage level of the video signal in said video apparatus, means connected to a source of power for providing a reference voltage, means for coupling said detecting means to a source of the video signal in said video apparatus, means coupled to said detecting means and responsive to said reference voltage for comparing said detected voltage level with said reference voltage to provide an output voltage signal when the voltage level of said video signal is diminished due to absence of picture information in said video signal for at least a period equal to one frame, and voltage responsive means coupled to said comparing means and responsive to said output voltage signal for activating said switching means for a predetermined period thereby controlling the operation of said video apparatus.

2. An editing system in accordance with claim 1 wherein said means for coupling said detecting means to said video signal source includes video signal amplifying means.

3. An editing system in accordance with claim 1 wherein said video apparatus comprises a video tape recorder having a pause control and including means for connecting said switching means to said pause control to interrupt the operation of said video tape recorder.

4. An advertising editing system in accordance with claim 1 wherein said video apparatus comprises a television set having an audio output and including means for coupling said switching means to said audio output for discontinuing said audio output.

5. An editing system in accordance with claim 4 wherein said detecting means include a RC filter including a capacitor, said capacitor being charged to the level of the voltage detected by said detecting means to control the output of said voltage output signal from said comparing means.

6. An editing system in accordance with claim 5 including means for adjusting the level of the reference voltage in said comparing means to select the output voltage at which said voltage responsive means will respond.

7. An editing system in accordance with claim 6 wherein said voltage responsive means include a pair of control gates, means for connecting the input of one of said control gates to said comparator means, means for connecting the output of said one control gate to the input of the other of said control gates, and means for connecting the output of said other control gate to said switching means.

8. An editing system in accordance with claim 7 wherein said control gates comprises Schmitt trigger gates.

9. An editing system in accordance with claim 7 wherein said means for connecting the output of said one control gate to the input of said other control gate include a diode and wherein said timing means are connected between said connecting means for said control gates and said associated source of DC power.

10. An advertising editing system in accordance with claim 9 wherein said timing means comprises a resistor and a capacitor connected in parallel between said control gates connecting means and said source of DC power.

* * * * *